Patented Apr. 21, 1931

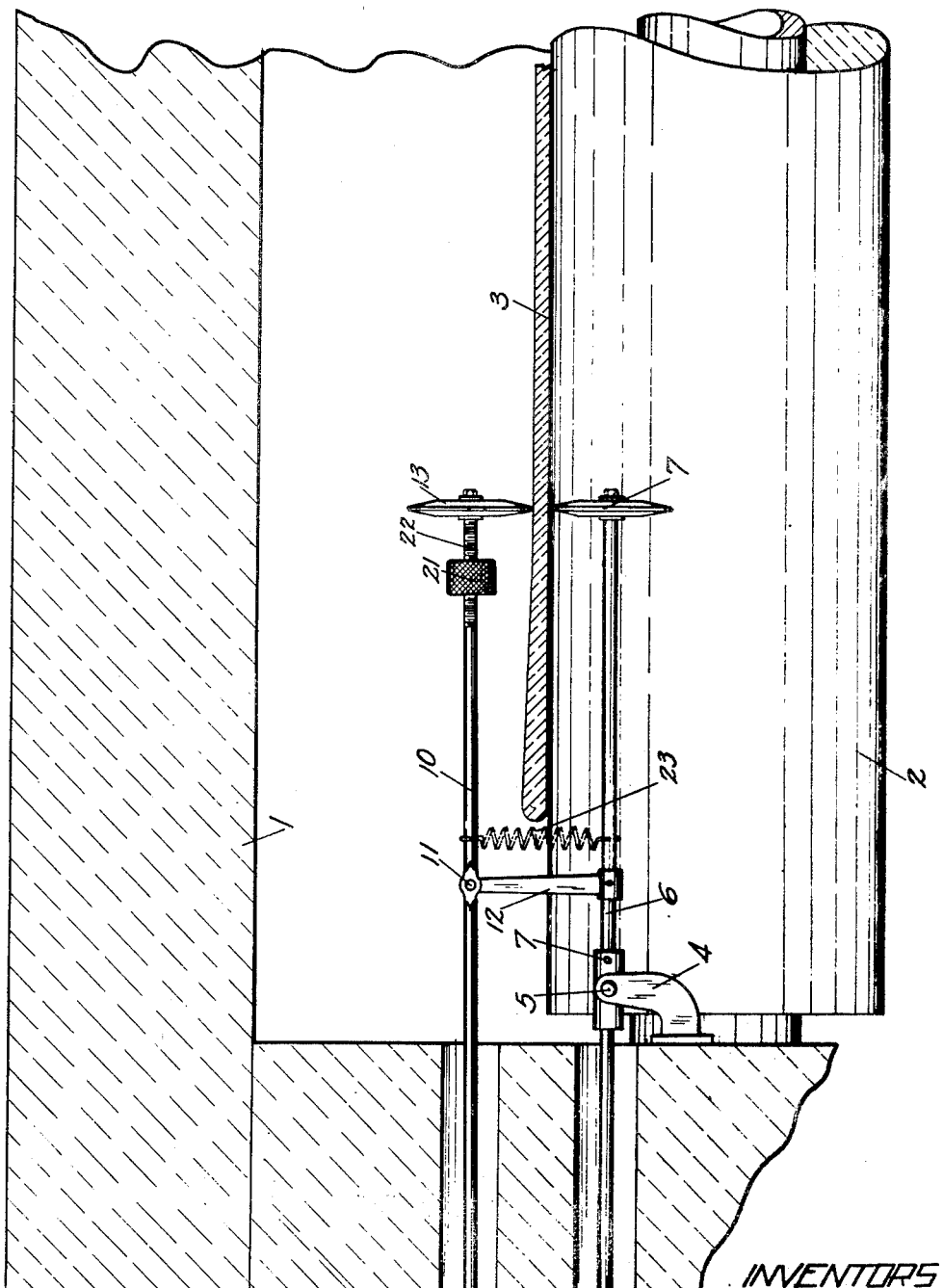

1,801,270

UNITED STATES PATENT OFFICE

WILLIAM GRAY AND WILLIAM BROWN, OF LANCASTER, OHIO, ASSIGNORS TO LIBBEY-OWENS-FORD GLASS COMPANY, OF TOLEDO, OHIO, A CORPORATION OF OHIO

GAUGE FOR SHEET GLASS

Application filed January 21, 1924. Serial No. 687,498.

This invention relates to an improved indicating gauge for measuring the thickness of sheet glass or similar material.

In certain forms of sheet glass producing mechanism, the continuous strip or ribbon of glass, after leaving the sheet-making machine, is carried slowly through a long horizontal annealing oven or leer before it emerges onto the cutting table where the strip is divided up into sheets of suitable form for handling. At this place an operator with a gauge measures the sheet from time to time to see that the strength or thickness remains correct, and if variations from the normal are noted proper adjustments must be made at the sheet-forming machine. Since the leer is often two hundred feet or more in length, it will be noted that a considerable quantity of glass will have been produced before the error has been noticed.

The object of the present invention is to provide a gauge which may be located in the leer, a short distance from the sheet-producing machine, and which will indicate at all times the thickness of the sheet of glass as it passes by that point. This will enable the operator to make adjustments more promptly and will avoid the production of excessive quantities of glass of undesired thickness.

The gauge in the form here shown comprises a pair of rollers held in engagement with the two surfaces of the sheet at opposite points, and an indicating mechanism on the gauge shows at all times the distance between the two rollers and consequently the thickness of the sheet at that point. The entire gauge is mounted to ride bodily with the sheet, in case the sheet is warped or for any other reason moves away from its supporting rollers, so that the indicator will merely show changes in sheet thickness regardless of any bodily movement of the sheet and gauge.

The invention will be more clearly understood from the following detailed description of one approved form of the appartus.

The accompanying drawing shows an elevation of one of the indicating gauges in operation, a portion of the sheet of glass and the annealing leer being shown in transverse vertical section.

At 1 is shown a portion of the enclosing wall of the leer or oven, and 2 is one of a plurality of driven rollers which support and carry the continuous glass sheet 3 through the leer.

A bracket 4 is mounted on one of the leer walls at a suitable point between a pair of the sheet-carrying rollers 2, and the entire gauge is pivoted at 5 in this bracket. The supporting frame of the gauge comprises a rod 6 having an enlarged central portion 7 pivoted at 5 in bracket 4. At the inner end of rod 6 is mounted a freely rotatable roller 7, which bears against the lower face of glass sheet 3. At the outer end of rod 6 is fixedly mounted an upwardly extending bracket 8, carrying at its upper end the arcuate scale member 9. A lever 10 is intermediately pivoted at 11 upon an upwardly extending bracket arm 12 carried by rod or frame 6. At the inner end of lever 10 is a freely rotatable roller 13 similar to the roller 7 previously described. The pair of rollers 7 and 13 bear against the glass sheet 3 at opposite points so that the distance between these two rollers will be the same as the thickness of the glass sheet at that point.

The other end of lever 10 has a pin-and-slot connection 14 with the short arm 15 of the bell-crank lever pivoted at 16 on bracket 8. The longer arm 17 of the bell-crank terminates in a pointer 18 which moves across the scale 9. This scale will be suitably calibrated to indicate in small fractions of an inch the distance between rollers 7 and 13 and consequently the thickness of the sheet 3. As here shown, the scale 9 is calibrated for a machine adapted to produce four different grades of glass, known as "single strength", "double strength", three-sixteenths inch, and one-quarter inch glass. When the machine is producing one grade, such as one-quarter inch glass in the construction here shown, the pointer will normally be opposite the line marked ¼" on the scale. If the thickness of the sheet varies one way or the other from the normal, the variation will be indicated by pointer 18 on scale 9, and the proper adjustments can be made on the sheet-producing machine. When the correct adjustments have been made the results will be indicated on scale 9.

The outer end of frame rod 6 is threaded as at 19 and a weight 20 is threaded upon this portion of the rod. That portion of the gauge to the left of pivot 5 in the drawing should slightly overbalance the right hand portion so that the roller 7 will normally be held in engagement with the lower surface of sheet 3. By properly adjusting the weight 20, this balance may be obtained so that roller 7 will bear against sheet 3 with a constant but not excessive pressure. A similar weight 21 is threaded upon the inner end 22 of rod or lever 10, and by properly adjusting the position of this weight the upper roller 13 may be caused to bear upon the upper surface of sheet 3 with the desired pressure. The two weights 20 and 21 tend to move the rollers 7 and 13 toward one another and hold them against the sheet at opposite points. If desired, a spring 23 (indicated in dotted lines) may be used either as a substitute for, or in addition to, the weight 21. When the gauge is used in a highly heated atmosphere, the use of weights is preferable to springs.

It will be noted that if sheet 3 should be warped at some point or for any other reason should ride up away from the supporting rollers 2, the gauge as a whole can swing with the sheet about its pivot 5 without appreciably affecting the reading on scale 9, which will at all times indicate merely the distance between the rollers 7 and 13 and consequently the thickness of the glass sheet.

While this indicating gauge has been designed primarily for use in measuring the thickness of sheet glass, it is obviously well adapted for measuring other sheet material which may be carried in the form of a continuous strip past the gauging device.

Claims:

1. In a thickness indicating gauge for sheet material, a pair of rollers adapted to engage the opposite sides of the sheet and being movable relative to one another, a frame carrying the rollers, means for supporting the frame so that it may swing bodily at right-angles to a sheet disposed in a predetermined position to allow the rollers to follow a warped sheet, and means on the frame for indicating the distance between the rollers.

2. In a thickness indicating gauge for sheet material, a pair of rollers adapted to engage the opposite sides of the sheet and being movable relative to one another, a frame carrying the rollers, means for supporting the frame so that it may swing bodily at right-angles to a sheet disposed in a predetermined position to allow the rollers to follow a warped sheet, means for holding the rollers against the opposite faces of the sheet, and means on the frame controlled by the rollers for indicating the thickness of the sheet.

3. A thickness-indicating gauge for sheet material, comprising a pivotally mounted frame, a roller carried by the frame in position to engage one side of the sheet, a lever pivoted to the frame, a roller carried by the lever in position to engage the other side of the sheet opposite the first named roller, means for holding the rollers in engagement with the sheet surfaces, a scale on the frame, and means operated from the lever for indicating the thickness of the sheet on the scale.

4. A thickness-indicating gauge for sheet material, comprising a fixed supporting bracket, a frame pivoted to the bracket to swing freely at right-angles to the plane of the sheet, a roller carried by the frame in position to engage one side of the sheet, a lever pivoted to the frame, a roller carried by the lever in position to engage the other side of the sheet opposite the first named roller, means for holding the rollers in engagement with the sheet surfaces, a scale on the frame, and means operated from the lever for indicating the thickness of the sheet on the scale.

5. A thickness-indicating gauge for sheet material, comprising a fixed supporting bracket, a frame pivoted to the bracket to swing freely at right-angles to the plane of the sheet, a roller carried by the frame in position to engage one side of the sheet, a lever pivoted to the frame, a roller carried by the lever in position to engage the other side of the sheet opposite the first named roller, a weight on the frame, and a weight on the lever for holding the rollers against the opposite sheet surfaces, a scale on the frame, and means operated from the lever for indicating the thickness of the sheet on the scale.

6. In a thickness indicating gauge for continuously moving sheet material, means engaging the opposite sides of the sheet and being movable relative to one another, a frame carrying said sheet engaging means, means for supporting the frame so that it may swing bodily at right angles to a sheet disposed in a predetermined position to allow the sheet engaging means to follow a warped sheet, and means on the frame for indicating the thickness of the sheet.

7. In a thickness indicating gauge for continuously moving sheet material, rotatable means adapted to engage the opposite sides of the sheet and being movable relative to one another, a pivotally mounted frame carrying the sheet engaging means and adapted to be swung bodily at right angles to a sheet disposed in a predetermined position to allow said rotatable means to follow a warped sheet, means for normally urging said rotatable means into engagement with the opposite sides of said sheet, and means on the frame for indicating the distance between said sheet engaging means.

8. In a thickness indicating gauge for continuously moving sheet material, a pair of rollers adapted to engage the opposite sides of the sheet and being movable relative to one another, means for supporting said rollers so that they may swing bodily at right angles to a sheet disposed in a predetermined position whereby to follow a warped sheet, and means carried by said roller supporting means for indicating the distance between the rollers.

Signed at Lancaster, in the county of Fairfield, and State of Ohio, this 17th day of January, 1924.

WILLIAM GRAY.
WILLIAM BROWN.